United States Patent [19]
Ratte et al.

[11] Patent Number: 5,373,720
[45] Date of Patent: Dec. 20, 1994

[54] METHOD OF MAKING BATTERY TERMINAL WITH NECKED FLANGE

[75] Inventors: Robert W. Ratte, North Oaks; Ronald Cain, White Bear Lake; Norman E. Peterson, Wyoming, all of Minn.

[73] Assignee: Water Gremlin Company, White Bear Lake, Minn.

[21] Appl. No.: 29,869

[22] Filed: Mar. 11, 1993

Related U.S. Application Data

[63] Continuation-in-part of Ser. No. 940,391, Sep. 3, 1992, Pat. No. 5,296,317, and Ser. No. 16,370, Feb. 11, 1993.

[51] Int. Cl.$^5$ .............................................. B21J 13/02
[52] U.S. Cl. ...................................................... 72/354.8
[58] Field of Search ................ 72/354.6, 354.8, 355.4, 72/355.6, 358

[56] References Cited

U.S. PATENT DOCUMENTS

| | | | |
|---|---|---|---|
| 2,901,527 | 8/1959 | Mocas | 136/168 |
| 3,096,579 | 7/1963 | Waller | 72/41 |
| 3,101,534 | 8/1963 | Lange | 72/361 |
| 3,113,892 | 12/1963 | Albrecht . | |
| 3,186,209 | 6/1965 | Friedman | 72/356 |
| 3,280,613 | 10/1966 | Schröm | 72/359 |
| 3,736,642 | 6/1973 | Miller et al. | 29/204 |
| 3,744,112 | 7/1973 | Lindenberg | 29/204 |
| 3,793,086 | 2/1974 | Badger | 136/134 |
| 3,835,686 | 9/1974 | Lawson et al. | 72/354 |
| 3,842,646 | 10/1974 | Kuhn | 72/354.8 |
| 3,945,097 | 3/1976 | Daniels, Jr. et al. | 29/2 |
| 3,947,936 | 4/1976 | Wheadon | 29/2 |
| 4,041,755 | 8/1977 | Rut | 72/353 |
| 4,100,674 | 7/1978 | Tiegel | 29/623 |
| 4,146,771 | 3/1979 | Tiegel | 219/78.16 |
| 4,177,551 | 12/1979 | Johnson et al. | 29/623.1 |
| 4,291,568 | 9/1981 | Stifano | 72/356 |
| 4,352,283 | 10/1982 | Bailey | 72/354 |
| 4,362,043 | 12/1982 | Hanson | 72/355.4 |
| 4,406,146 | 9/1983 | Suzuki | 72/353 |
| 4,416,141 | 11/1983 | Nippert | 72/345 |
| 4,422,236 | 12/1983 | Ware, Jr. et al. | 29/876 |
| 4,423,617 | 1/1984 | Nippert | 72/356 |
| 4,580,431 | 4/1986 | Oku et al. | 72/334 |
| 4,662,205 | 5/1987 | Ratte | 72/359 |
| 4,776,197 | 10/1988 | Scott | 72/353 |
| 4,945,749 | 8/1990 | Walker et al. | 72/356 |

FOREIGN PATENT DOCUMENTS

| | | |
|---|---|---|
| 645083 | 7/1962 | Canada ............................. 72/354.6 |
| 0040951 | 12/1981 | European Pat. Off. . |
| 0117213 | 8/1984 | European Pat. Off. . |
| 0261311 | 3/1988 | European Pat. Off. . |
| 1146149 | 3/1963 | Germany . |
| 371154 | 9/1963 | Switzerland . |
| 2141654 | 1/1985 | United Kingdom . |

OTHER PUBLICATIONS

Gould print 8RD 5539.
Gould print 8RD 5538.

*Primary Examiner*—Lowell A. Larson
*Attorney, Agent, or Firm*—Jacobson & Johnson

[57] ABSTRACT

A cold-forming method of making a finished battery terminal with a necked down flange by first expanding the metal radially outward until the battery terminal die cavity is partially filled with metal and then upsetting the metal to complete the deformation filling of the battery, terminal die cavity and to simultaneously form a necked down region in the flange on the battery terminal.

9 Claims, 14 Drawing Sheets

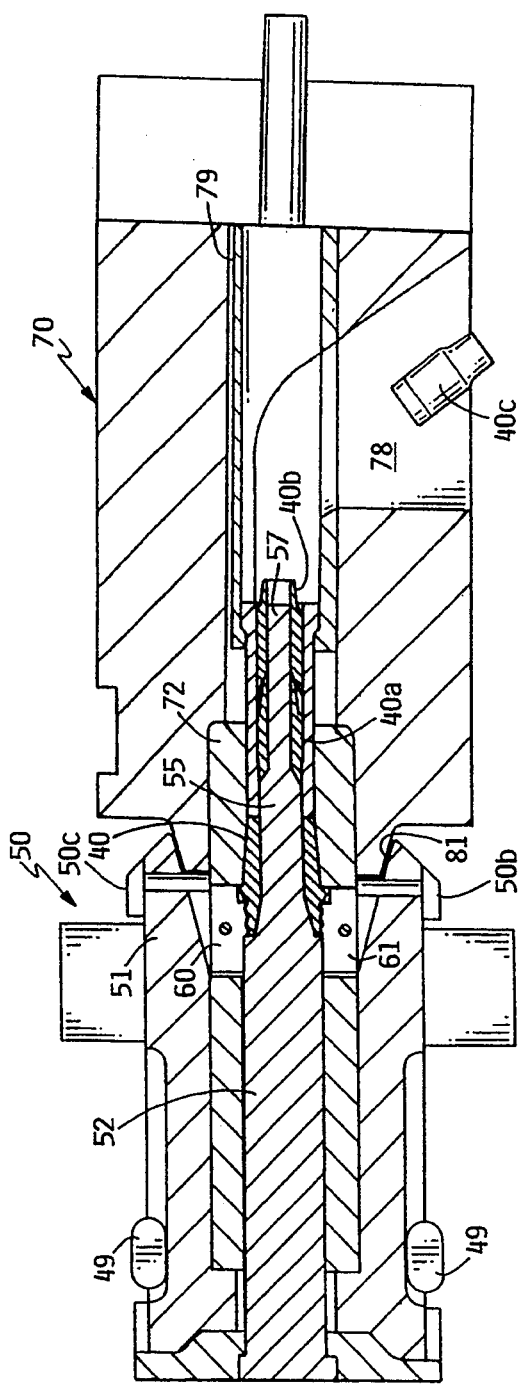
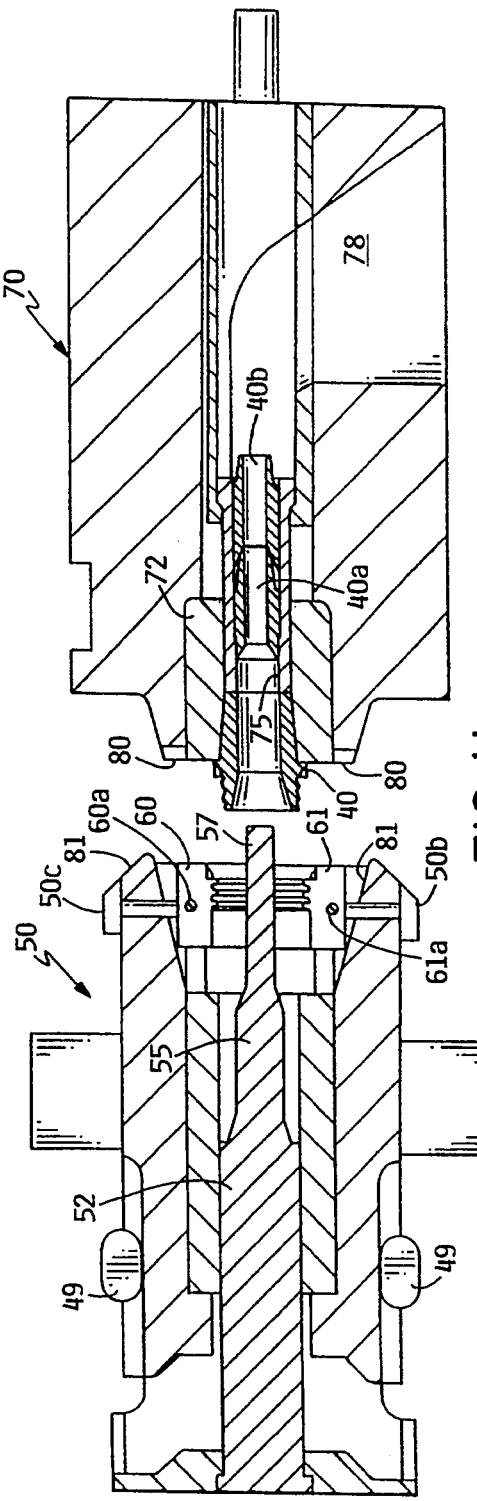
FIG. 10
FIG. 11

METHOD OF MAKING BATTERY TERMINAL WITH NECKED FLANGE

CROSS REFERENCE TO RELATED APPLICATIONS

This application is a continuation in part of our application Ser. No. 940,391 filed/Sep. 3, 1992 titled High Torque Battery Terminal and Method of Making Same, now U.S. Pat. No. 5,296,317 granted Mar. 22, 1994 and application Ser. No. 08/016370 filed Feb. 11, 1993 titled High Torque Battery Terminal and Method of Making Same.

FIELD OF THE INVENTION

This invention relates generally to battery terminals and an improved method of making battery terminals by cold forming. Our corresponding prior an application discloses cold forming battery terminals through the process of forming a lead slug into a cylindrical cup and then punching out the end of the lead slug while expanding the lead slug radially outward into a die having the shape of a finished battery terminal.

The present invention comprises improvements to the aforementioned process by permitting one to cold form a battery terminal with a necked down region extending around the flanges of the battery terminal.

BACKGROUND OF THE INVENTION

The process of cold forming metals is well known in the art. Typically a deformable or malleable metal is deformed at room temperature through a series of compression and/or expansion steps. Cold forming has been used to form various articles including automotive items such as spark plug housings and battery terminals. Typically, spark plug housings are made of steel alloys and other articles, including battery terminals, are made of softer metals such as lead or lead alloys. While cast battery terminals have been used satisfactorily, cold formed battery terminals may be preferable since the working of the metals during the cold forming process appears to remove air pockets. The result is a more dense terminal that hinders electrolyte from escaping through the terminal. Although lead can be cold formed quite readily the leak-proof sealing of lead terminals to battery. containers after the terminal has been formed is difficult since the battery terminal also needs to have a leak-proof seal between the terminal and the battery wall. Sealants have now been developed that enable battery manufactures to seal cold formed battery terminals to the battery container in a leakproof relationship.

One of the first cold formed battery terminals that was commercially available is shown in the Gould Inc. drawings dated 1974. The product was made and sold by applicant's assignee Water Gremlin Company to Gould Inc. in 1974.

Another commercially available battery terminal made and sold by applicant's assignee Water Gremlin Company is shown in the U.S. Pat. No. 4,662,205 which shows the cold forming of a finished battery terminal for a starved lead acid battery used as back up power source for an emergency lighting system. The U.S. Pat. No. 4,662,205 shows a machine for cold casting battery electrodes through use of end punches. In this process, a slug is cut off by machine and automatically fed into a chamber where the opposite ends of the slug are compressed between opposing punches to form a battery terminal. The U.S. Pat. No. 4,776,197 shows a method for forming a semi-finished battery tertninal through a cold-forging process where the cylindrical slug is also compressed from opposite ends and subsequently finished to remove the unfinished ends of the battery terminal slug. The present invention provides a process for cold forming a lead slug into a finished battery terminal with a necked down region that can be directly inserted into a battery container.

DESCRIPTION OF THE PRIOR ART

U.S. Pat. No. 4,580,431 shows a method and apparatus for cold forming a stepped article such as a gear blank.

U.S. Pat. No. 4,352,283 shows a six stage method for cold forming a hollow spark plug body.

U.S. Pat. No. 4, 291,568 shows a method of cold working an alloy steel to produce a socket wrench.

U.S. Pat. No. 3,186,209 shows a method of cold forming metal to form a hollow metal body such as a spark plug shell.

U.S. Pat. No. 3,096,579 shows a method of cold forming metal to produce accurately shaped and hollow metal articles.

U.S. Pat. No. 3,835,686 shows a method of cold forming a steel slug to a hollow shank with a head for use as a roller clutch sleeve.

U.S. Pat. No. 3,280,613 shows a method of cold processing metal such as a steel slug to produce a spark-plug housing.

U.S. Pat. No. 3,101,534 shows a method of cold forming steel or the like to produce wrist pins or similar articles.

U.S. Pat. No. 4,416,141 shows a method of cold forming a ductile metal such as copper.

U.S. Pat. No. 4,423,617 shows a method of cold forming a welding electrode.

U.S. Pat. No. 3,793,086 shows a method of producing liquid-tight through the partition battery intercell electrical connectors through pressure welding.

U.S. Pat. No. 3,113,892 shows a battery terminal post and cover construction using a heat-resistant bushing to protect the thermoplastic battery cover during the filling of the terminal with molten lead. The battery terminal includes lugs to interlock with the container.

U.S. Pat. No. 3,744,112 shows a machine for the manufacture of subassemblies for storage batteries.

U.S. Pat. No. 4,100,674 shows a method of connecting battery terminals to battery lugs through use of resistance welding.

U.S. Pat. No. 3,945,097 shows a method and apparatus for making expanded lead grids from strips of expanded lead.

U.S. Pat. No. 3,947,936 shows a process for coining (cold forming) cast lead grids to remove the sharp edges and extend the life of the grid.

U.S. Pat. 4,146,771 shows an electrical welding apparatus for making integral and homogeneous connections between a terminal and a battery lug.

U.S. Pat. No. 4,177,551 shows a method of forming a through-the-partition intercell connection between adjacent cell groups and a multicell lead acid battery by arc welding the two units together.

U.S. Pat. No. 3,736,642 shows an apparatus for squeezing the intercell connections in a battery. to form the connectors into an electrical connection.

U.S. Pat. 4,406,146 shows a die for cold forging internal tapered grooves for use on items such as sockets that are interacting for constant velocity joints of a universal joint.

U.S. Pat. 4,041,755 shows a method for forging single crank throw elements for a high powered engine.

European Pat. No. 040,951 shows an alloy which is useful in the manufacture of cold worked lead acid storage battery components, in particular grids.

British patent specification 1,245,255 shows a method of making a flange on a bushing to prevent leakage of electrolyte from the battery.

Russian patent 774,752 shows a machine for upsetting and cold forming opposite ends of a rod.

Russian Pat. No. 776,731 shows a machine for stamping metal articles.

U.S. Pat. No. 4,177,665 shows a process for cold forming articles from slugs.

U.S. Pat. No. 4,166,373 shows a method of cold forming an article to produce a socket-like member.

European patent application 0,117,213 shows a process of cold forming a work piece to simultaneously extrude the skirt and boss.

U.K. patent application 2,141,654A shows a method of forming a spark plug shell through a cold extrusion process.

The drawing dated May 3, 1974 shows a 1974 commercially available cold formed battery terminal made through the cold-forming process.

U.S. Pat. No. 4,422,236 shows an extrusion process for making a lead or lead alloy battery terminal by forging the material around an object such as a screw or the like.

U.S. Pat. No. 4,662,205 shows a machine for cold casting battery electrodes through use of end punches. In this process, a slug is cut off by machine and automatically fed into a chamber where the opposite ends of the slug is compressed to form a battery terminal.

U.S. Pat. No. 4,776,197 shows a method for forming a semi-finished battery terminal through a cold-forging process where a cylindrical slug is deformed from opposite ends and subsequently finished to remove the two ends of the semi-finished battery terminal. EPC patent application 261,311 is similar to the U.S. Pat. No. 4,776,197 and shows a method for forming a semi-finished battery terminal through a cold-forging process where a cylindrical slug is deformed from opposite ends and subsequently finished to remove the two ends of the semi-finished battery terminal.

EPC patent application 40951 discloses cold working battery components such as terminals and grids.

U.S. Pat. No. 4,945,749 shows a method for cold forming a metallic bushing for a battery terminal.

BRIEF DESCRIPTION OF THE DRAWING

FIG. 10 is a view of the movable die case and the coacting stationary die case of FIG. 8 in a further closed position;

FIG. 11 shows the movable die case and the coacting stationary die case of FIG. 8 in an open position after formation of a battery terminal;

SUMMARY OF THE INVENTION

Briefly, the present invention comprises a cold-forming method of making a finished battery terminal with a necked down flange by first expanding the metal radially outward until the battery terminal die cavity is partially filled with metal and then upsetting the metal to complete the deformation filling of the battery terminal die cavity and to simultaneously form a necked down region in the flange on the battery terminal.

DESCRIPTION OF THE PREFERRED EMBODIMENT

Figure 1:
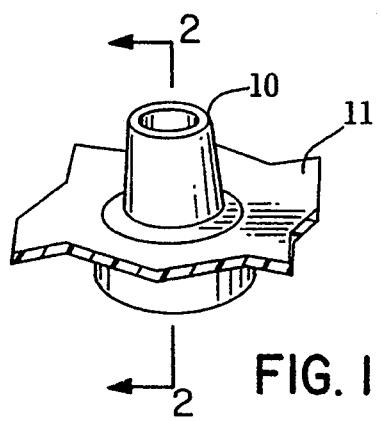
FIG. 1 shows a perspective view of a battery terminal inserted in a battery cover.
Figure 2:
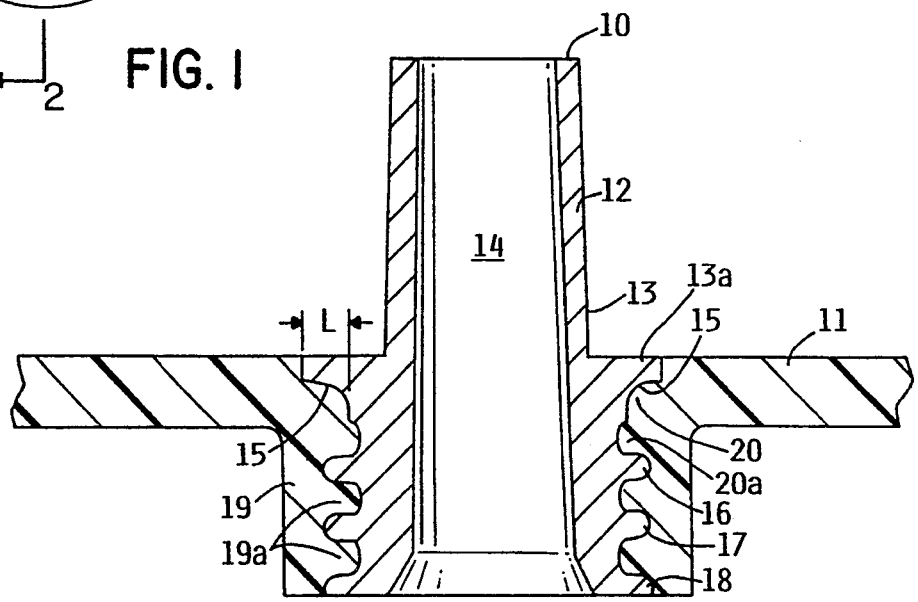
FIG. 2 is a cross-sectional view taken along lines 2—2 of FIG. 1.

In FIG. 1, reference numeral 10, generally identifies a cold formed high torque lead battery terminal as it appears in a thermoplastic battery container 11. FIG. 2 shows terminal 10 with a central or axial through passageway or opening 14 which will be subsequently filled with molten lead to form a mechanical and electrical connection to a battery grid within the battery container.

Figure 3:
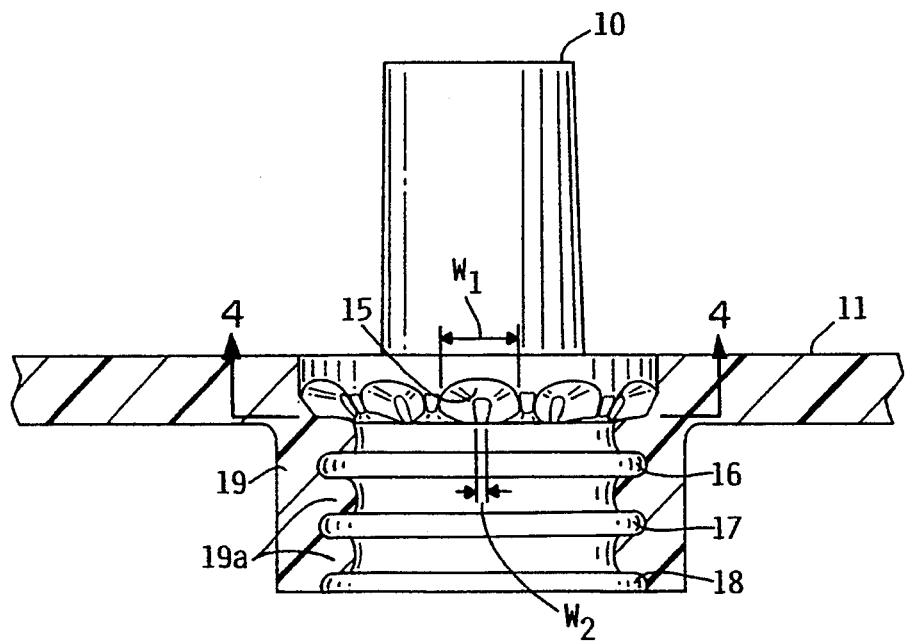
FIG. 3 is a view taken along lines 2—2 of FIG. 1 with the battery terminal not shown in section.
Figure 4:
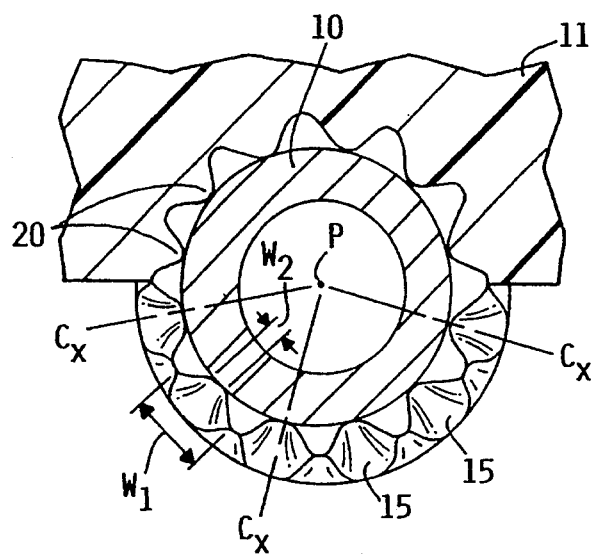
FIG. 4 cross-sectional view taken along lines 4—4 of FIG. 3.

FIG. 2, FIG. 3 and FIG. 4 show battery terminal 10 integrally formed or secured to battery container 11 in a torque resistant relationship by the coaction of terminal torque lock regions 15 and a moldable container material 19 such as a thermoplastic resin. Annular rings 19a of the container material 19 fill a set of annular openings located between parallel spaced acid-sealing rings 16, 17 and 18 which extend radially outward from terminal 10. Battery terminal 10 has a frusto-conical shaped hollow top portion 12 with an outer facing 13 for forming electrical connection with a battery connector. As viewed in FIG. 2 a protrusion member 20 has a massive base since the protrusion member extends vertically upward from annular cover member 20a that abuts against acid ring 16. The result is protrusion members 20 that are vertically restrained in container 11 by terminal ring 13a and acid ring 16.

FIG. 3 shows an end view of torque locks 15 that form a series of three sided general pyramid-like recesses 15 in the skirt of battery post 10. The recesses 15 are characterized in that they have a base dimension $W_1$ which is substantially larger than the top dimension $W_2$ so that the mating protrusions in battery container material 19, which fit into recesses 15, have a massive support base which tapers toward a narrower top.

FIG. 4 shows a sectional view taken along line 4—4 of FIG. 3 to illustrates how the battery container material, which forms three sided pyramid-like protrusions members 20, projects into torque locks 15 to thereby form circumferentially spaced retaining lugs for locking battery terminal 10 to container 11. Torque locks 15 are located circumferentially around terminal 10. Torque locks 15 are equal distance from one another with center lines $C_x$ extending through each of the torque locks to intersect at a central point P. The use of the torque locks 15 in battery terminal allows one to provide a substantially strong and rigid torque resistant support between battery terminal 10 and container 11. That is, tests have shown that by using torque locks 15 and three sided protrusions 20 extending from the molded container into the torque locks of a positive battery terminal produces such tenacious and integral connection between the container and the positive battery terminal that, in some cases, when the top portion 12 is subjected to a twisting high torque the top portion 12 of the battery terminal shears off before the terminal twists free of the container.

In the preferred embodiment the inward projecting members 20 are spaced circumferentially around the periphery of the battery terminal 10 and project inward. Twelve three sided projecting members 20 are located around the periphery of battery terminal 10 to integrally engage twelve torque locks on terminal 10.

Figure 5:
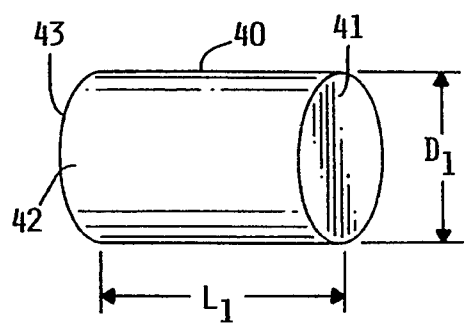
FIG. 5 shows a cylindrical metal slug for use to cold form into a battery terminal in accord with the teaching of this invention.

The terminal 10 is readily adaptable to forming through a horizontal cold forming process that converts an extruded lead slug into a finished battery terminal for mounting in a battery container. FIG. 5 shows a cylindrical lead slug 40 formed through a conventional extrusion process. Lead slug 40 has a cylindrical outer surface 42, a first end 43 and a second end 41. The diameter of the slug is designated by $D_1$ and the length of the slug is designated by $L_1$. Prior to forming slug 40 into a finished battery terminal the slug is worked and shaped to square up the ends and the diameter of the slug so that the cold forming of the battery terminal can be performed in a single cold forming operation. In addition the pre-working of the lead is desirable since the lead cold forms better if the lead has been pre-worked.

Figure 6:
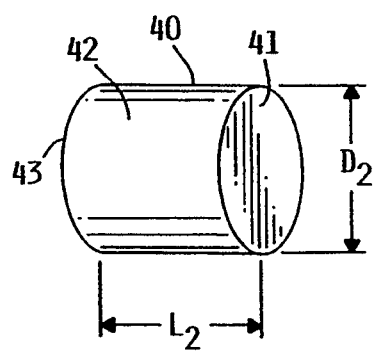
FIG. 6 shows the cylindrical slug of FIG. 5 after its faces have been squared off.

FIG. 6 shows lead slug 40 after further partial pre-working. Slug end faces 41 and 43 have been squared while the diameter $D_2$ remains substantially the same as diameter $D_1$. As a result of the end squaring process, the length $L_2$ of slug 30 may be slightly shorter than the length $L_1$ of the slug prior to the pre-working step.

Figure 7:
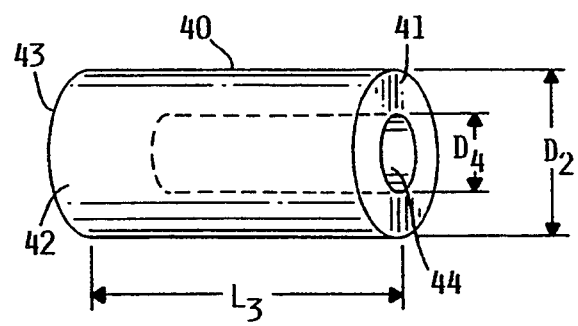
FIG. 7 shows the cylindrical slug of FIG. 6 with a cylindrical cavity or recess formed at one end.

FIG. 7 shows the cylindrical lead slug 40 after the final pre-working step that produces a slug for cold forming. During the final preworking step a cylindrical punch has been directed into a central portion of end 41 of slug 40 to produce a cylindrical cavity 43 that extends about half the depth of the lead slug with a diameter $D_4$. In this step, slug 40 increases in length because the punch forces the lead in the central portion of the slug to flow onto the end of the slug as the lead slug is confined by a cylindrical chamber (not shown) of diameter $D_2$. After the final pre-working step slug 40 has an outer diameter of diameter $D_2$ and a cavity of diameter $D_4$. After the final preworking steps the slug is now ready for cold forming into a finished battery terminal. As pointed out the purpose of the preworking of the lead slug is to prepare the metal for cold forming since preworked metal is easier to cold form. In addition the cold forming produces suitable dimensions on the lead slug to permit the cold forming process through coaction of a die and punch. While slug 40 is shown with a cavity 43 that extends about half way into slug 40, the cavity 43 may be formed in different depths. In certain applications, cavity 43 could extend completely through the lead slug and in other applications lead slug 40 can be processed without any cavity.

Figure 8:
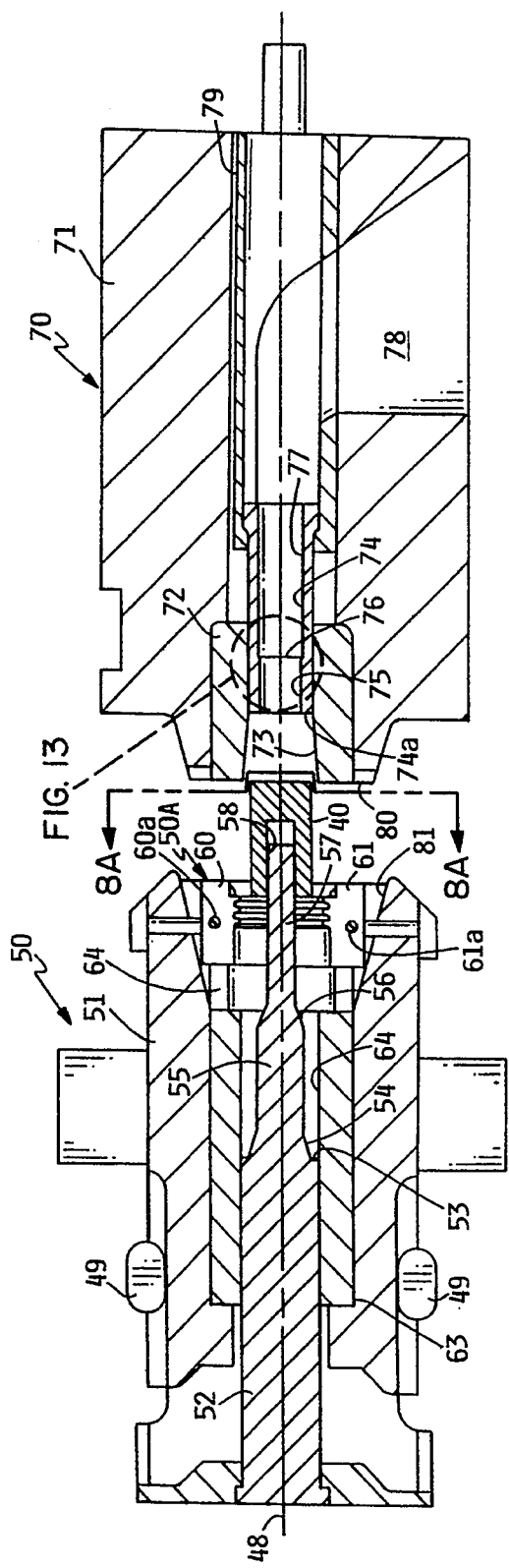
FIG. 8 is a cross-sectional view of a movable die case and a coacting stationary die case for cold forming the slug into a battery terminal with the dies located in the open position.
Figure 8A:
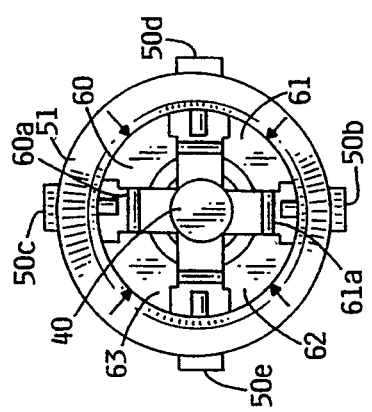
FIG. 8A is a view of the movable die case taken along lines 8A—8A of FIG. 8.

FIGS. 8 through 12 show the process of forming the pre-worked cylindrical lead slug 40 into a battery terminal in greater detail. Reference numeral 50 identifies a movable die case and reference numeral 70 identifies a stationary die case. Reference numeral 49 identifies upper and lower members for moving movable die case along central axis 48. Preworked lead slug 40 is shown located on end 57 of a punch 52 which includes numerous cylindrical stepped sections as well as frusto-conical connecting regions. Punch 52 includes a cylindrical end face 53, a frusto-conical connecting region 54, a cylindrical section 55, a further frusto-conical connecting region 56, a cylindrical section 57 having an end surface 58. The diameter of section 57 is slightly more than the diameter $D_4$ so that lead slug 40 is maintained on punch section 57 through frictional engagement between slug 40 and punch section 57. Punch 52 is powered by a source (not shown) and slides within a sleeve 63 which sliding supports a four-part radially collapsible die section 50a which is axially displaceable in die case 50. Quadrant segments 60 and 61 of die section 50a are shown in FIG. 8. FIG. 8A shows an end view of movable die 50 to illustrate all four segments 60, 61, 62 and 63. Die segments 60, 61, 62 and 63 slide on frusto conical surface 64 to permit each of the die segments to be displaced axially and radially around lead slug 40. A set of radial pins 50c, 50d, 50b, and 50e extend inward to act as stops for the die segments, a set of cross pins 60a, 61 a, 60b, and 61b act as lateral guides to permit the die segments to move radially inward while maintaining alignment with each other. The front of movable die case 50 contains a frusto conical guide surface 64 so that die segments 60, 61, 62 and 63 can be collapsed around slug 40. While the die segments 60, 61.62 and 63 can be collapsed around lead slug 40 the die segments 60, 61, 62 and 63 do not do any deforming of the lead slug 40 during the collapsing step. That is the die segments 60, 61, 62 and 63 collapse to form a die chamber having the shape of the lower portion of a battery terminal which contains the protrusions and recesses to form acid sealing rings 16, 17 and 18.

Figure 9:
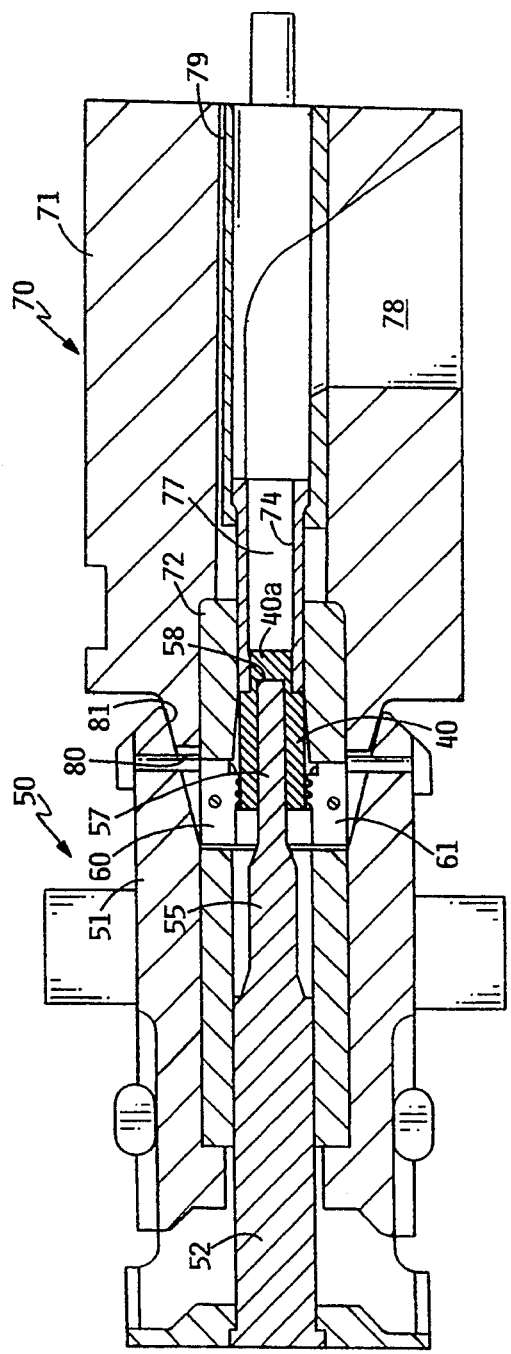
FIG. 9 is a view of the movable die case and the coacting stationary die case of FIG. 8 in a partially closed position.

The companion to movable die case 50 is stationary die ease 70, which includes an outer member 71 and a die 72 for forming the top portion 12 of a battery terminal. Die 72 contains a frusto-conical section 73 which forms the cavity 73 for forming the top portion of a battery terminal. An ejector sleeve 74 slides within die 72. Ejector sleeve 74 includes an end surface 74a, a first inner surface 75 and a second inner surface 77 of slightly larger diameter. A waste retaining lip 76 connects first inner surface 75 and second inner surface 77. Located to the right of ejector sleeve 74 is a passage 78 for discharging lead removed during the cold working of the lead slug. The end of die 70 includes members 80 which abut against the closed four split die segments 60, 61, 62 and 63 when die 50 is moved axially against stationary die 70. FIGS. 9 and 10 illustrate the cooperative relationship of die 50 and die 70. FIG. 9 shows lead slug 40 confined in the die segments 60, 61, 62 and 63 and die section 72. An end of slug 40 is shown partially displaced by end 58 of punch section 57. Punch section 57 is completing the formation of a through hole in lead slug 40 by forcing a portion 40a of lead slug 40 through the interior of ejection sleeve 74. During this first through hole punching phase with cylindrical punch section 57 lead slug 40 is not radially expanded outward although the die segments 60, 61, 62 and 63 and die section 72 do not prevent radially outward deformation of lead slug 40.

FIG. 10 illustrates the cold forming process in a more advanced state with slug 40 radially deformed and separated from excess lead 40a. FIG. 10 shows that cylindrical punch section 55 has radially expanded the hollowed lead slug radially outward into die segments 60, 61, 62 and 63 and die section 72 to form a finished battery terminal. Waste lead 40a is located on the inside of ejector sleeve 74 and pushes waste lead slugs 40b located in ejector sleeve 74. In operation, waste lead 40c is pushed out of ejector sleeve 74 by waste lead 40a and waste lead 40b as shown in FIG. 10. Waste lead 40c falls out passage 78.

FIG. 11 illustrates movable die 50 in a retracted position with lead slug 40 formed into a finished battery terminal which is frictionally held by the sides of die section 72 of die 70.

Figure 12:
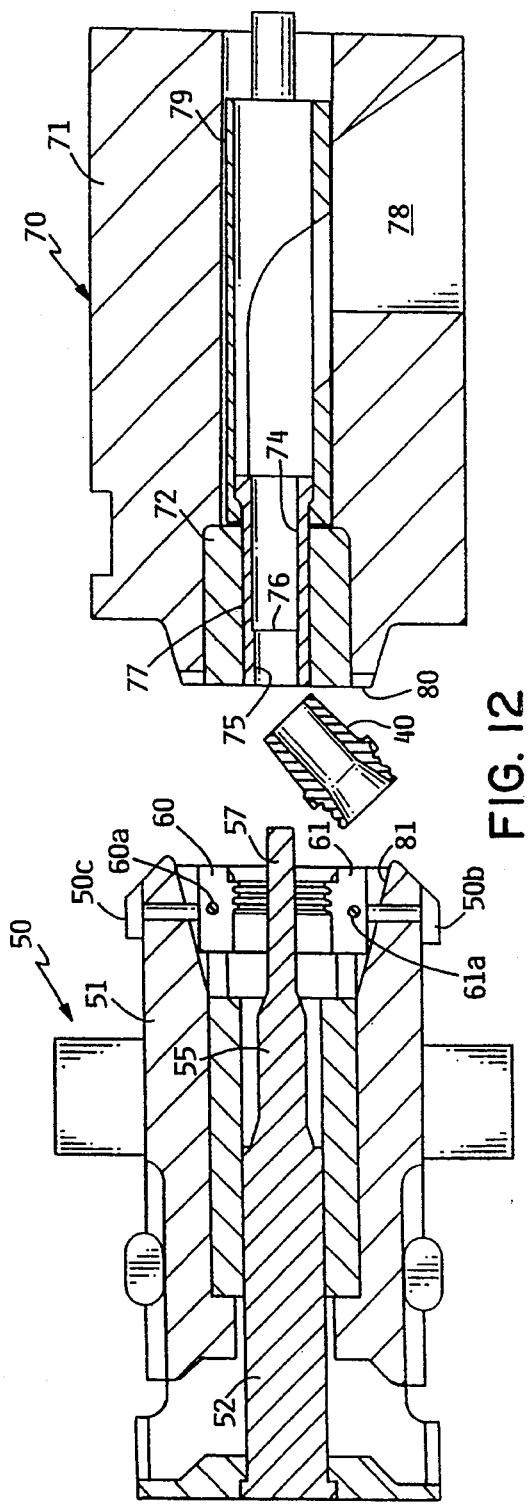
FIG. 12 shows the movable die case and the coacting stationary die case of FIG. 8 in the ejection position.

FIG. 12 illustrates ejector sleeve 74 forcing finished battery terminal 40 out of stationary die 70.

Thus, in the process of the present invention, a cylindrical cupped shaped lead slug is placed into a die and in a single operation a stepped punch forms a through opening in the lead slug, removes excess lead from the lead slug and radially deforms the remaining portion of the lead slug into a finished battery terminal ready for mounting into a battery container.

Figure 13:
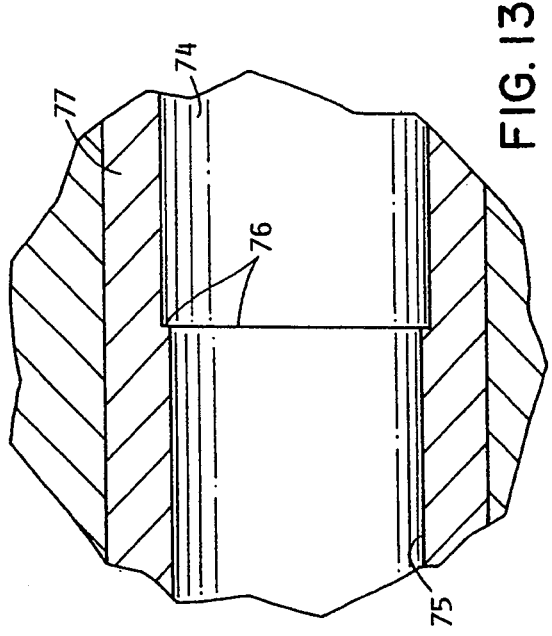
FIG. 13 shows an enlarged view of the retaining lip for removing waste lead.

To understand the operation of the removal of waste lead 40a with ejection sleeve 74, refer to FIG. 13 which is an enlarged view of interior cylindrical surfaces 74 and 75 which are connected by a cylindrical lip 76. The purpose of lip 76 is to provides a means for catching the waste lead 40a so that as pin 57 is withdrawn from slug 40 lip 76 prevents waste slug 40a from being pulled back with punch 57.

Figure 14:
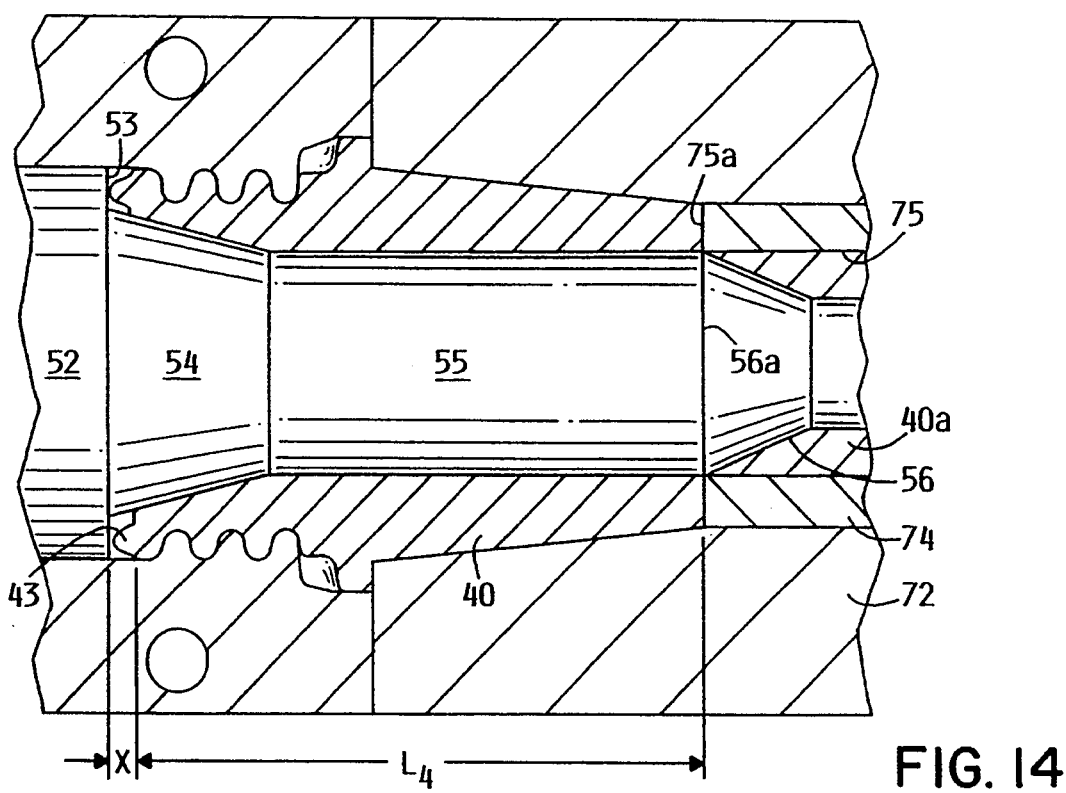
FIG. 14 shows an enlarged view of the lead slug prior to final deformation.
Figure 15:
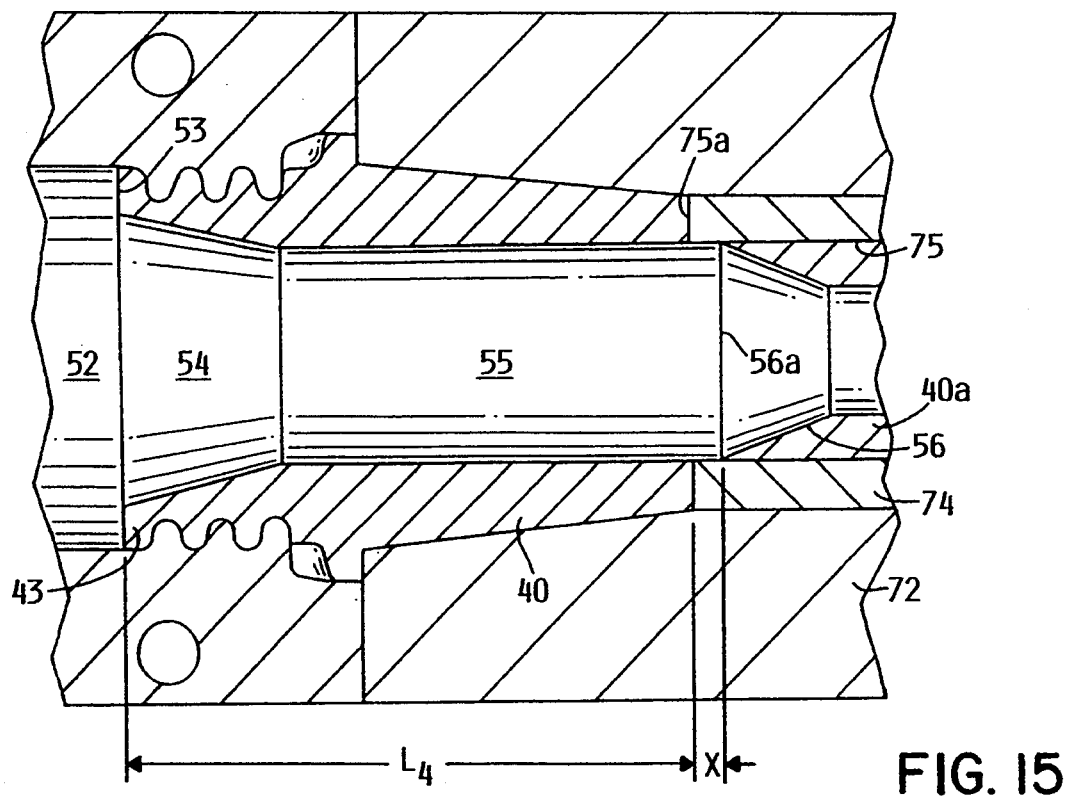
FIG. 15 shows the lead slug after final deformation just before the dies are opened.

During the cold forming process the punch and ejector sleeve coact so that the proper amount of lead remains within the dies during the final cold forming phase. FIG. 14 illustrates the final expansion of the lead slug as the first portion of cylindrical punch 55 seals off one end of the die chamber around lead slug 40. FIG. 14 shows an enlarged view of lead slug 40 at the moment the die chamber for forming the lead slug into a battery post or terminal is completely confined. The cylindrical punch surface 55 has an outside diameter that closely fits within the opening of ejector sleeve 74 to seal off one end of the die chamber for the lead slug. That is, when frusto conical base surface 56 (region 56a engages the inner surface 75 of ejector 74 it completely seals off one end of the die chamber for lead slug 40 as well as shears waste lead 40a from slug 40. Similarly, punch face 53 completely seals off the opposite end of the die chamber. FIG. 14 shows that at the moment of beginning shear of the waste lead portion 40a, the base section 53 of punch pin 52 is spaced a distance x from the final position. That is, prior to the final expansion of lead slug 40 waste lead 40a is separated from lead slug 40 and the die chamber is sealed at both ends. Even though the die chamber around the lead slug is sealed off there is sufficient amount of punch pin travel left before the final radial expansion and deformation of lead slug 40 is completed. That is, the portion of lead slug 40 remaining in the chamber has in effect been measured for the proper amount of lead for the final compression phase. During the final compression phase punch face 53 may travel the complete or partial distance x to complete the final formation of the battery terminal. Since lead is relatively deformable but incompressible the pressure on the die dramatically increases when the lead fills the closed die chamber. To prevent breaking of the dies pressurized chambers with a compressible gas (not shown) are used to close segments 60, 61, 62, and 63 so that sufficient pressure can be applied to pin 52 to produce the final deformation of lead slug 40. Consequently, this ensures that sufficient pressure is applied to lead slug 40 to completely deform slug 40 into a finished battery terminal.

While the present process is shown with regard to a cylindrical slug that is formed into a cylindrical terminal the process is equally well suited for forming battery terminals with lateral extending members as shown in U.S. Pat. 4,662,205.

Figure 16:
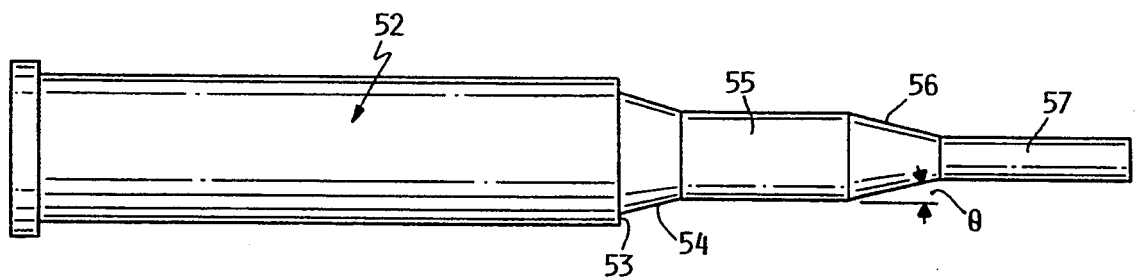
FIG. 16 is a side view of the punch of the present invention.

FIG. 16 reference numeral 52 identifies the improved step punch which is generally shown in FIGS. 8-12. At the front portion of punch 52 is a frusto-conical section 56 which forms a transition section between end cylindrical section 57 and the intermediate cylindrical section 55 of punch 52. It has been discovered that controlling the transition cone angle theta on punch 52 generally reduces the flash present in the finished part.

Figure 18:
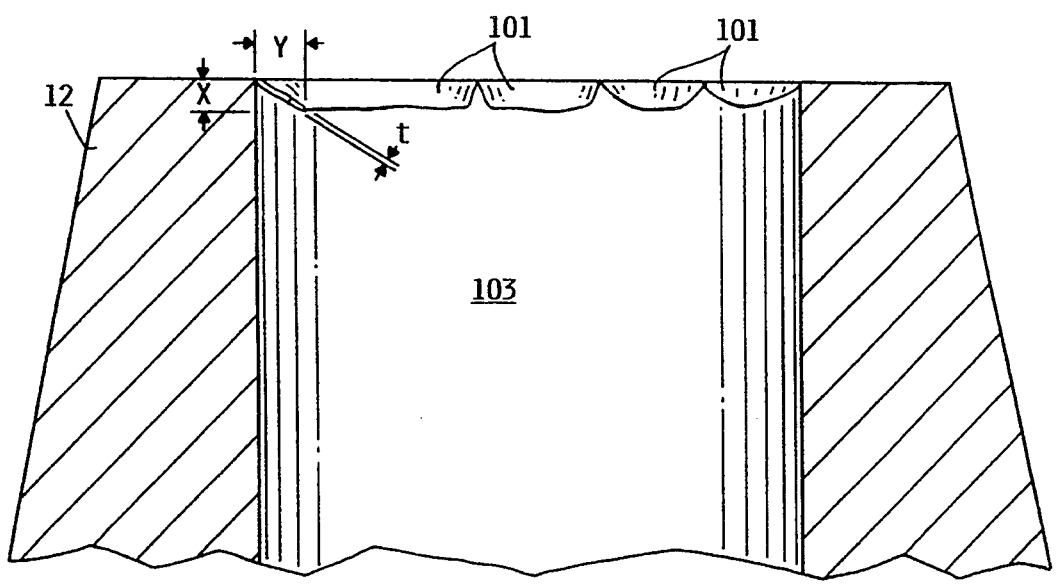
FIG. 18 is an enlarged sectional view showing a flash on a battery terminal.

To illustrate flash in a battery terminal, refer to FIG. 18 which shows an enlarged portion of the battery terminal 12 with flash 101 extending outward from the inside corner of terminal 12. Typically, flash 101 comprises a thin section of extruded metal which extends radially inward a distance y and downward a distance x. While the size of the flash may vary, the typical flash may have an x dimension of 0.005 Inches and a y dimension of 0.005 inches with a thickness z of 0.0001 inches. Since the internal region 103 is to be filled with lead, the presence of flash 101 in the interior region normally causes no problems. However, if the terminals are handled roughly, flash 101 may flake off and fall into the plastic used to mold the battery cover around the battery terminal, thereby creating the possibility for introducing a short in the battery.

The improvement in the process comprises a method and means for eliminating the flash. One of the known ways to eliminate flash is to have the exact amount of lead necessary to expand into die 130. Another is to have the lead positioned in the die so it uniformly fills the die during the cold forming process. Unfortunately, precisely controlling the amount of lead to fill up the die is difficult to do during a cold forming process.

Figure 17:
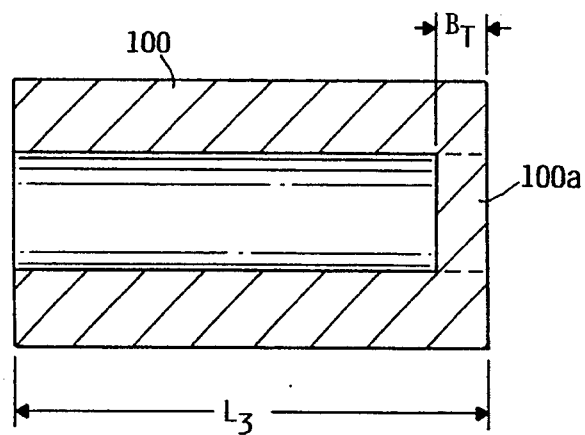
FIG. 17 is a cross sectional view of a lead slug cold formed in a shape of a cylindrical cup.
Figure 19:
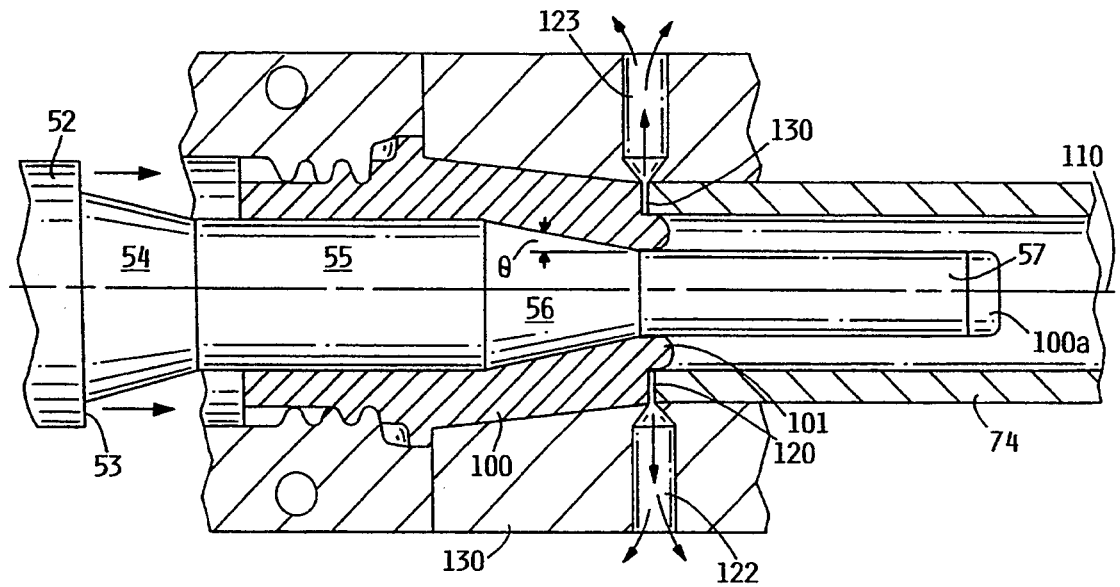
FIG. 19 is a cross sectional view illustrating transition zone forcing excess lead out of the die.

An alternate approach is to form a lead slug with a known amount of excess lead and then remove the excess lead during the cold forming process. In the present process. excess lead is removed in two steps. First, the end of the cylindrical lead slug is punched out and then the remaining excess lead is forced out in an annular shaped member extending around pin 52. It should be pointed out that slug 100 (FIG. 17) is shown having a bottom thickness designated by $b_t$. The purpose of having a cylindrical bottom 100a is to facilitate handling of the lead slug during the forming steps; that is, the bottom section 100a of slug 100 allows end of pin 57 to positively engage slug 100 and force the slug to seat against the end of sleeve 74 (FIG. 9 and 19). Once seated, the end 100a of slug 100 is removed as the end of pin 57 continues forward to remove the excess lead in the shape of a cylindrical plug 100a (FIG. 19). Thus, it is envisioned that if other means were used to seat slug 100 in the die, one could use an annular slug rather than a cylindrical cup-shaped slug for radial deformation of a battery terminal in die 130.

Figure 20:
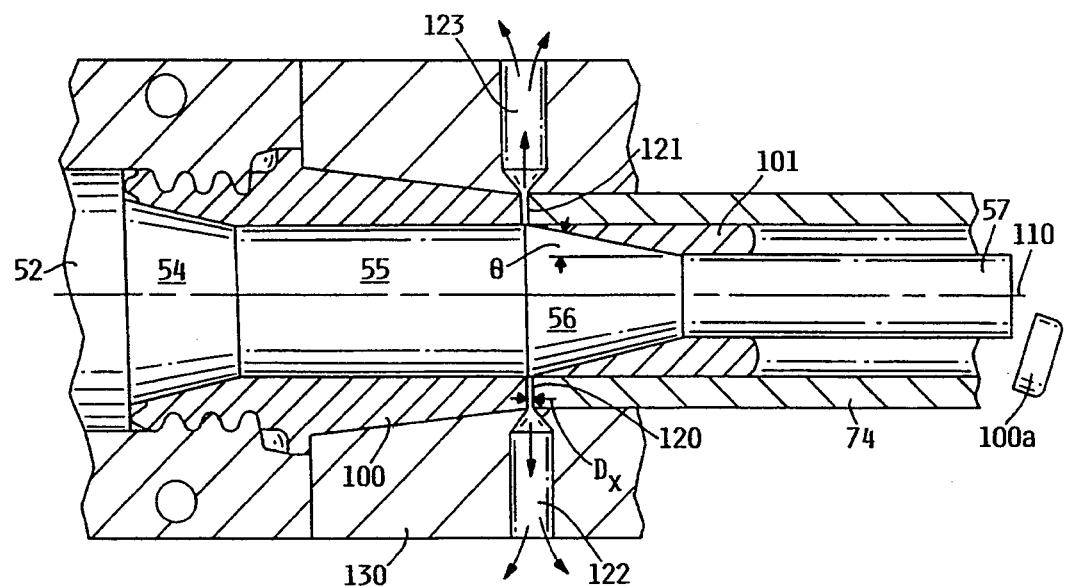
FIG. 20 is a cross sectional view showing the punch forcing excess lead from the die.

While flash is a problem in cold forming parts, one of the additional problems in closed cold deformation of a lead slug and particularly in high speed cold forming of pans is that air may not be completely purged from the die prior to closing the die. Consequently, local irregular deformation of the cold formed part may occur. To alleviate the problem of local deformation due to trapped air, we provide peripheral spaced elongated die vent holes proximate the end of the die where excess material is forced out. FIG. 19 shows die 130 and multi-step punch 52 coacting to radially expand lead slug 100 into a battery terminal. In FIG. 19, punch 52 is shown with a portion of the forward travel of the punch yet to be completed, and FIG. 20 shows punch 52 with the forward travel completed. FIG. 19 illustrates that during the radial expansion process, excess lead 10 1 extends in an annular shaped section 101 and is forced forward of section 56 as punch 52 moves forward.

Located peripherally around die 130 are a series of narrow, elongated vent passages 120 and 121. Vent passage 121 connects to a larger discharge passage 123, and vent passage 120 connects to a larger discharge passage 122. The vent passages are narrow to allow air to escape and are placed at the end of the die to prevent the vent passage from acting as a die cavity. Typically, vent passages 120 and 121 may have a width of up to 0.125-inches but have a depth $d_x$ of only about 0.0005-inches. The small depth vent passages allow air to escape and thus avoid local deformation as a result of air trapped within the die. While only two vent passages are shown, one may prefer to radially space more or less vent passages. Typically, four to six vent passages radially spaced around die 130 provide means for removing trapped air from the die.

FIG. 19 illustrates another feature of the process. Note, end plug 100a located on the end of pin 57. End plug 100a was forced out of the bottom of slug 100 (FIG. 17) to provide an annular slug 100 for radially expansion within die 130. Due to the rapid forward motion (indicated by arrows) of pin 52, end plug 100a is forced outward of ejector sleeve 74 and drops off the end of pin 57 (FIG. 20) as pin 52 reaches the end of its forward travel. Thus, a first portion of excess lead 100a is removed from slug 100 by pin 57 with a shearing or punching process. The second portion of excess lead removed from slug 100 comprises annular lead member 101 (FIG. 19) which is being formed around transition section 56 as lead is being forced radially outward and forward in front of section 56. As punch 52 continues its forward journey, annular waste lead member 101 is sheared from the end of slug 100 by co-action of punch section 55 with die 130 and the end of sleeve 74. Extending centrally through punch 52 is a central axis 110. Central axis 110 is concentric with die 130 and sleeve 74. FIG. 19 shows frusto-conical transition section 56 located between and smoothly connecting cylindrical pin sections 55 and 57 to each other. The transition zone 56 is maintained at an angle them which is less than 15 degrees. Preferably an 11 degree transition angle is preferred.

It has been discovered that the larger the angle them, the greater the pressure build-up in the die and the greater the chances for flash occurring during the cold forming of the terminal through a radial expansion process. On the other hand, the less the transition angle, the longer the transition zone 56. To avoid the transition zone from extending too far and consequently extending the required length of travel of pin 52, it is preferred to have the transition angle them a minimum of about 8 degrees.

It has been found that with a transition zone 56 of about 11 degrees, the excess metal 101 is sheared from the end of terminal 101 without creating excess deformation forces that force metal in the form of a flash between the outside of a die section 55 and the interior sleeve 74. While the optimal transition zone angle may vary with different components, one can readily determine the proper angle by observing the finished part. If the finished part is not completely filled out, the transition angle may be too shallow. Conversely, if the transition angle is too high, excessive deformation pressure is provided in the die forcing flash from parting surfaces between die 130 and sleeve 74.

Figure 21:
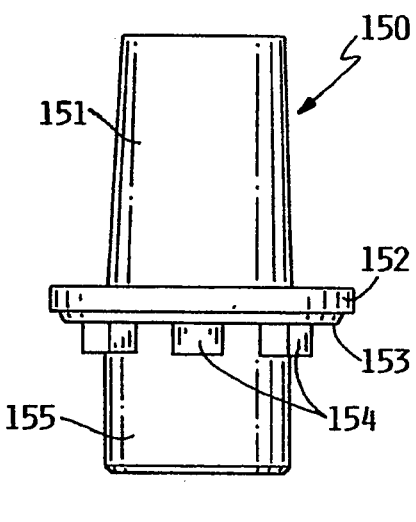
FIG. 21 is a front view of a battery terminal having a flange with a necked down region.
Figure 22:
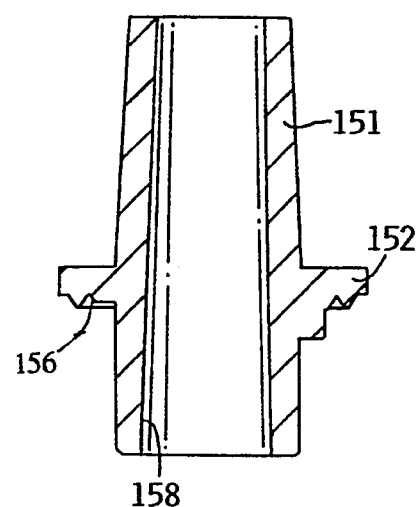
FIG. 22 is a sectional view of the battery terminal of FIG. 21 showing the necked down region on the flange of he battery terminal.
Figure 23:
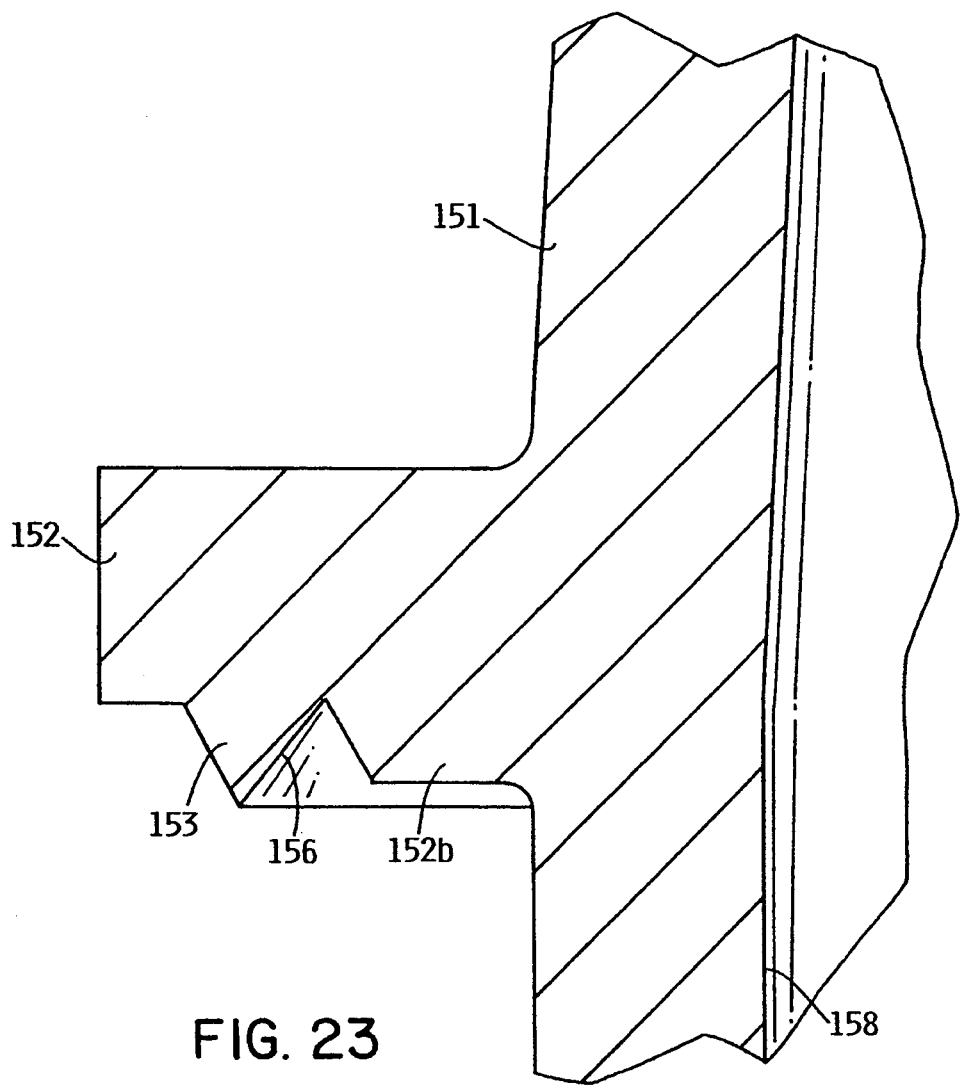
FIG. 23 is an enlarged view of a portion of FIG. 22.

While cold forming of battery terminals is preferred, there are certain battery terminal configurations which can not be cold formed to the proper dimensions. This is particularly true of battery terminals which have an outer flange with some type of a groove or acid-sealing ring located on the underside of the flange. FIGS. 21 and 22 illustrate such a battery terminal which is difficult to cold form. FIG. 21 shows a side view of such a battery terminal, and FIG. 22 shows a cross sectional view of the terminal.

FIG. 21 shows the battery terminal 150 having a frusto-conical top 151, a radially extending cylindrical flange 152 with a radial extending cylindrical skirt 153 located therearound. A series of rectangular shaped lugs 154 extend downward from flange 154 and radially outward from lower terminal section 155.

FIG. 22 shows a V-shaped groove 156 extending completely around the underside of flange 152. The presence of the V-shaped groove 156 creates problems in conventional cold forming of battery terminals. That is, in the process of cold forming battery terminals, the lead is deformed radially outward by a punch until a die cavity is completely filled, thereby forming the finished battery terminal. For the lead to be deformed radially outward for forming the battery terminal shown in FIGS. 21 and 22, the lead must not only flow radially outward but it must flow backward around the narrowed portion of the V-shaped groove 156. The V-shaped groove is shown in greater detail in FIG. 22. Note that flange 152 extends radially outward with a skirt 153 located radially outward of groove 156. The arrows indicate the general radial outward flow of metal during the cold forming process. If the V-groove 156 is not present, the metal can be radially formed outward as illustrated in FIGS. 8-12. However, the deformation of metal around the apex of 156 in order to form skirt 153 becomes difficult since excessive pressures are required which may cause flashing between the dies and, in certain instances, voids may be left in the cavity resulting in a defective battery terminal.

The present process provides a method and apparatus for cold forming battery terminals which have a narrowed neck or necked down region located in the flange of the battery terminal. To appreciate the process of applicant's apparatus for forming a battery terminal flange with a necked down region, reference should be made to FIGS. 24-28.

Figure 24:
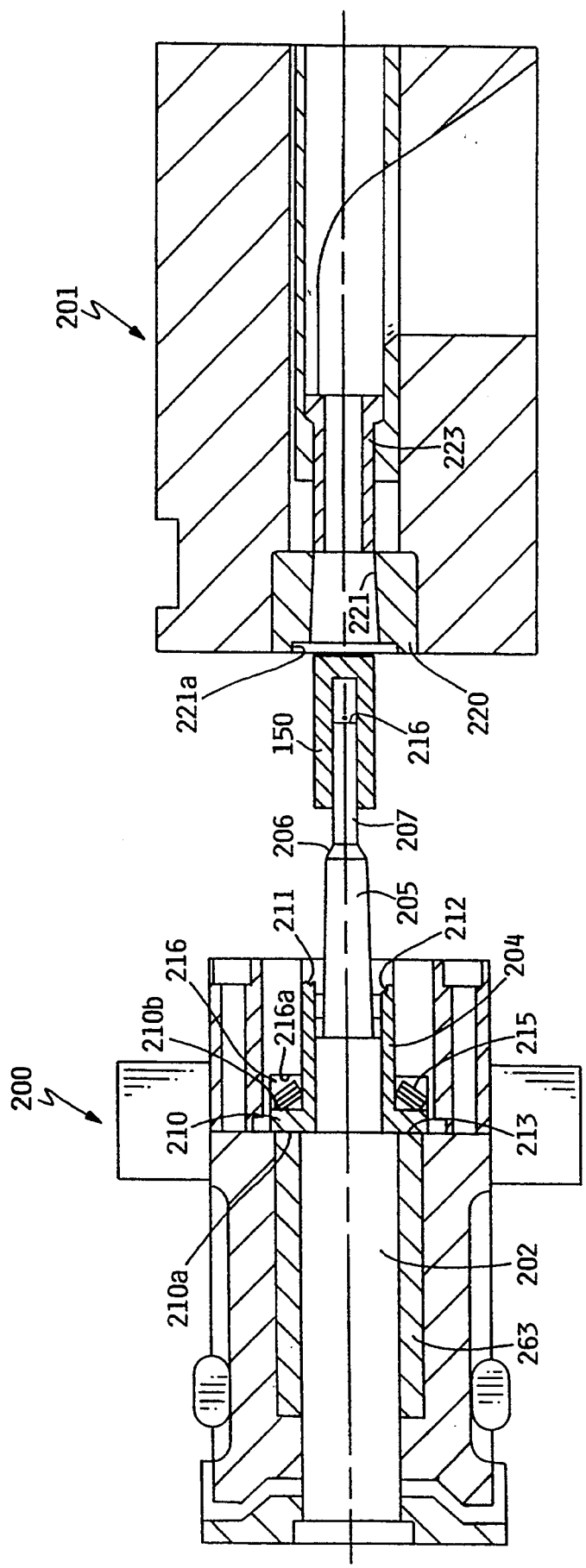
FIG. 24 shows two dies at the beginning of the stroke to cold form the battery terminal of FIG. 21.

FIG. 24 shows a movable die 200 and a stationary die 201. Die 201 is similar to die 70 and includes a die cavity 220 having a frusto-conical recess 221 for forming the top portion of a battery terminal. An injector sleeve 223, similar to injector sleeve 79, is located in die 201 for injecting the finished part. Movable die 200 includes a slidable punch 202. Punch 202 includes an annular end face 213, a cylindrical section 203, a frusto-conical connecting region 205, a further frusto-conical region 206, and a cylindrical section 207 having an end surface 216.

The diameter of section 207 is slightly larger than the inside diameter of the lead slug 150 so the lead slug is maintained in frictional contact on punch section 207 through frictional engagement between slug 150 and punch section 207. Punch 202 is powered by a source not shown and slides within a sleeve 263.

Located on pin 202 is a sleeve die 204 for forming the annular V-shaped groove in the underside of the battery terminal flange as well as the locking lugs located around the periphery of the battery terminal shown in FIGS. 21 and 22.

To understand the process of forming a finished battery terminal in a two-step operation, reference should be made to FIGS. 24-28. FIG. 24 shows lead slug 150 held on pin 207 in a position between die 200 and 201. In this position, the slug is ready to begin the process of deformation.

Figure 25:
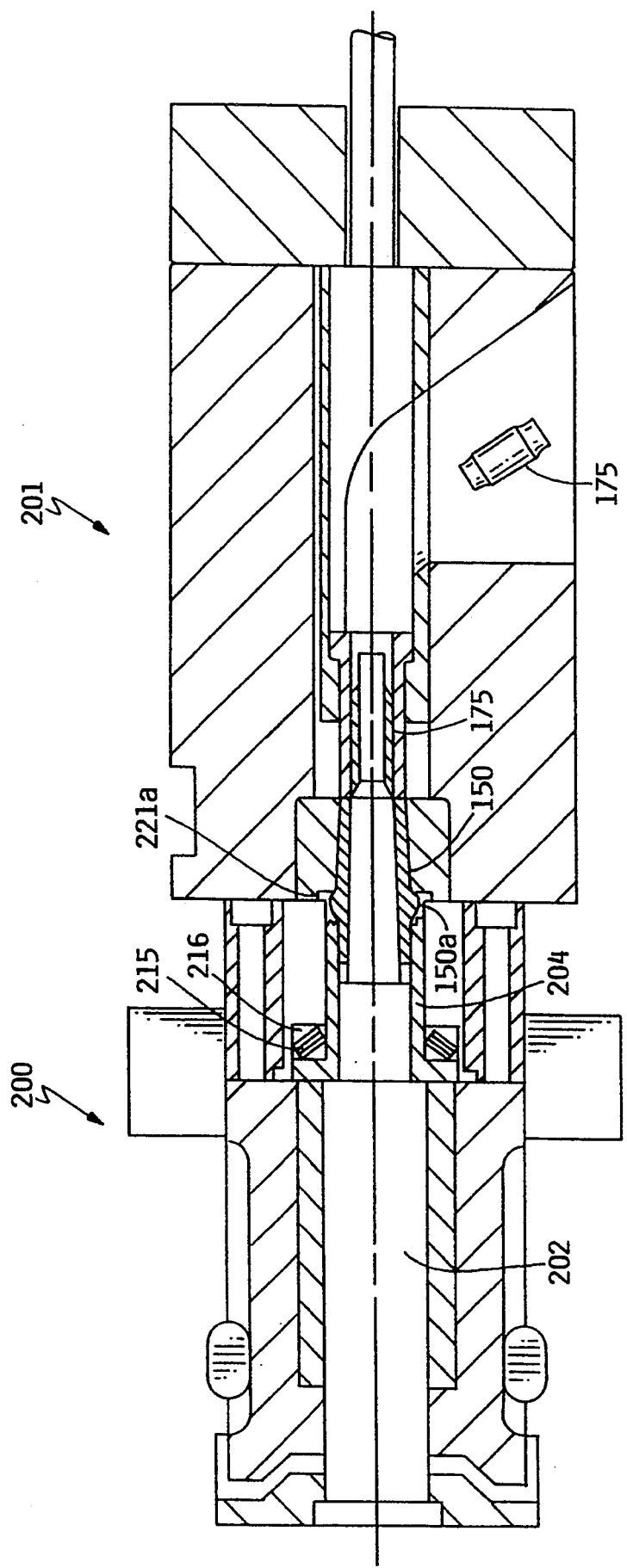
FIG. 25 shows a die punch radially expanding the metal outward into a flanged battery terminal cavity.

FIG. 25 shows the die 200 abutting against die 201 with punch 202 extending into and through lead slug 150. FIGS. 25 shows lead slug 150 being forced radially outward into the cavity 221a. The end of slug 175 is shown being forced out of die 201. In the condition shown in FIG. 25, the end of die sleeve 204 rests against punch end face 213 through the action of a compression spring 215 located in annular chamber 216. Note that in the position shown in FIG. 25, the metal 150a only partially fills the battery terminal cavity 221a.

Figure 26:
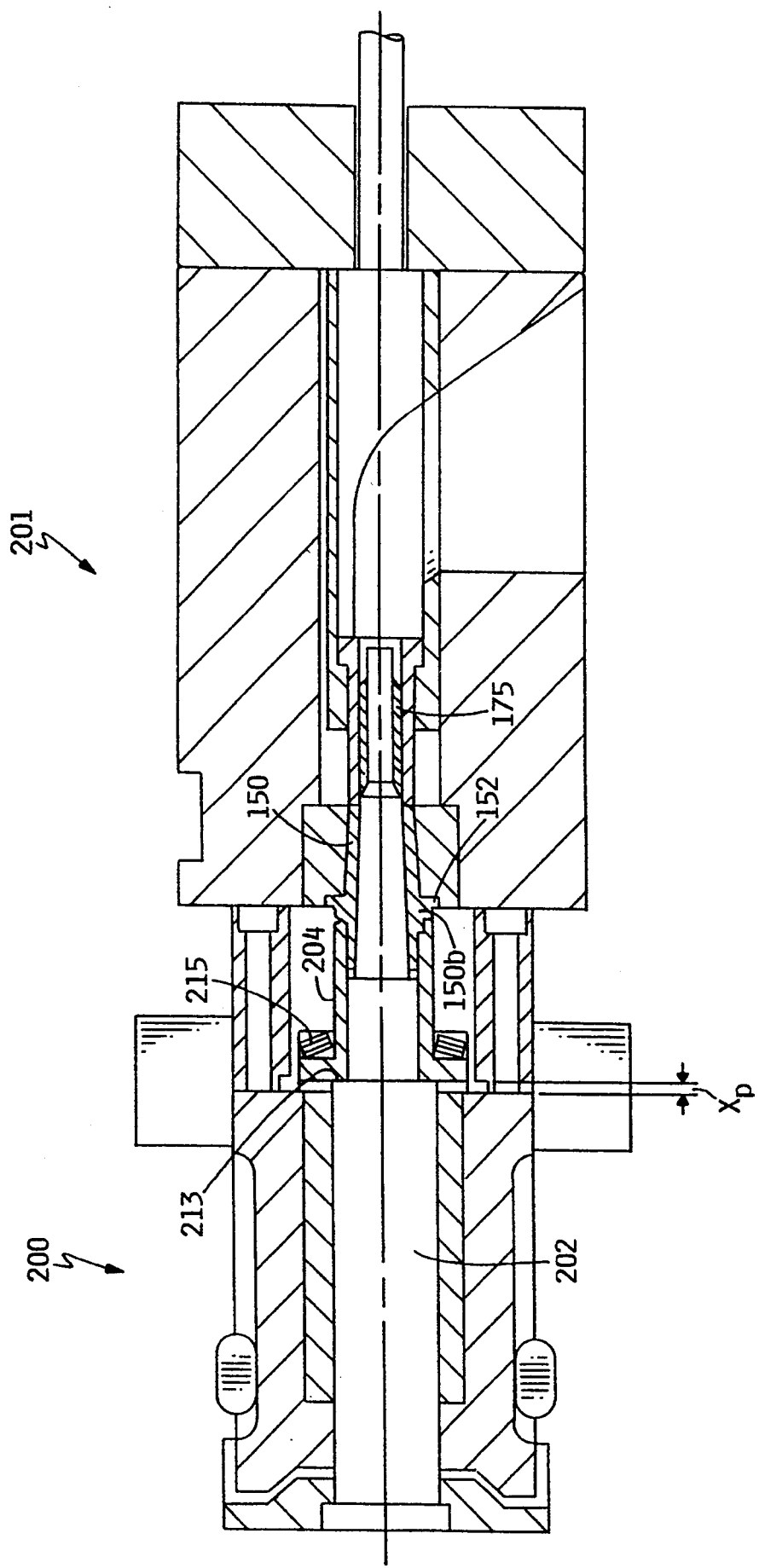
FIG. 26 shows a slidable sleeve die at the beginning of the stroke to necked down the flange on the battery terminal.

FIG. 26 illustrates the beginning of the formation of the neck in the flange area of a battery terminal. Note that die sleeve 204 is moved forward a distance $x_p$ by cylindrical end face 213. Spring 215 compresses to allow forward motion of die sleeve 204. The lead 150b located radially outward forms flange 152 with the slidable die 204 axially slidable along pin 202 to form the V-groove in the underside of flange 152.

Figure 27:
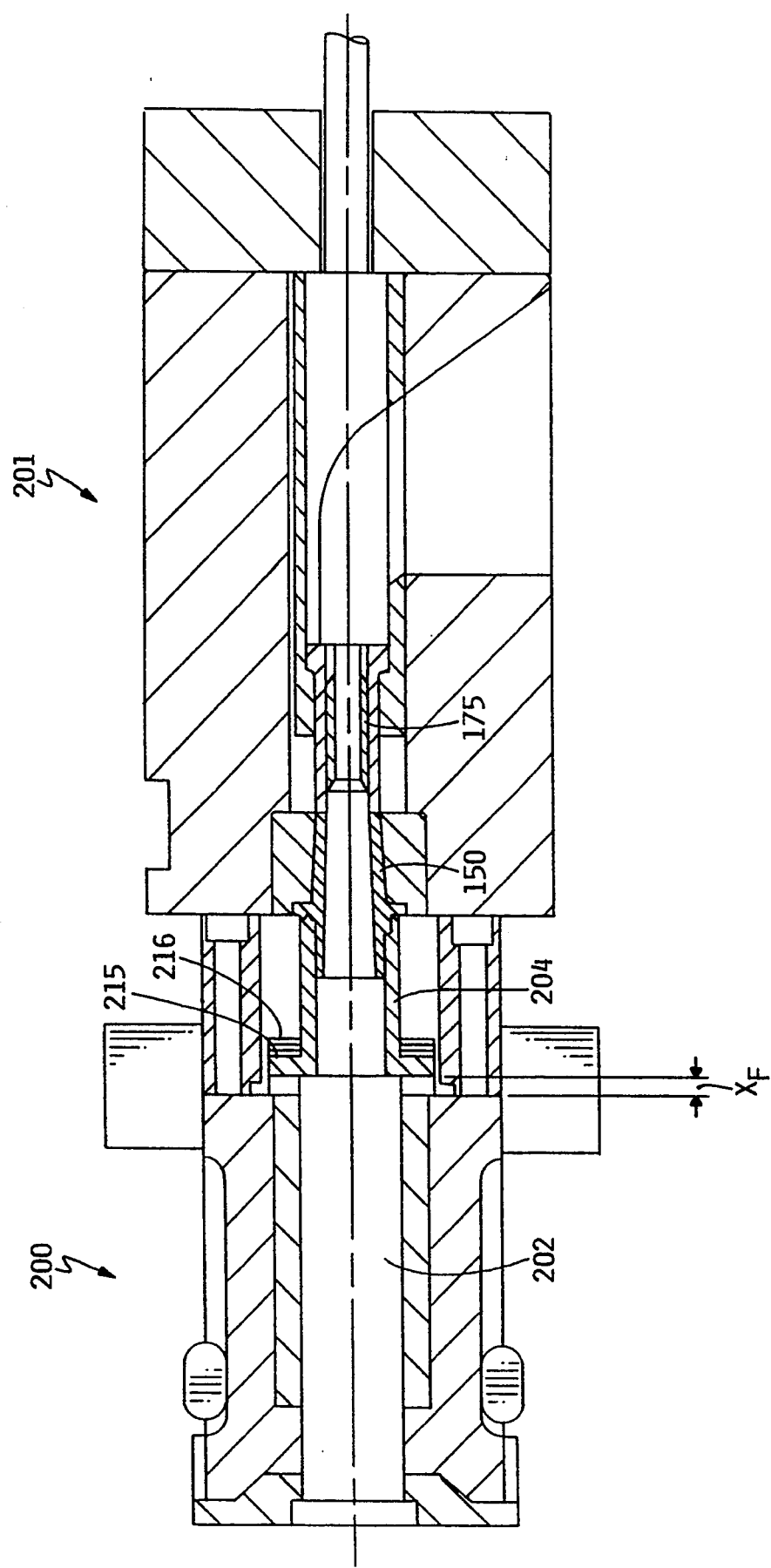
FIG. 27 shows the slidable sleeve die at the bottom of its stroke.

FIG. 27 shows pin 202 at the bottom of its stroke with sleeve 204 extending a distance noted by $x_f$. Note that spring 15 is fully compressed in annular chamber 216. This is in a later portion of the stroke. The opposite end of sleeve 202 actually deforms and necks down the flange 152 to form the V-shaped groove or acid ring on the underside of flange 152. With the die sleeve in the position shown in FIG. 27, the battery terminal 150 is in the finished condition and is ready for use.

Figure 28:
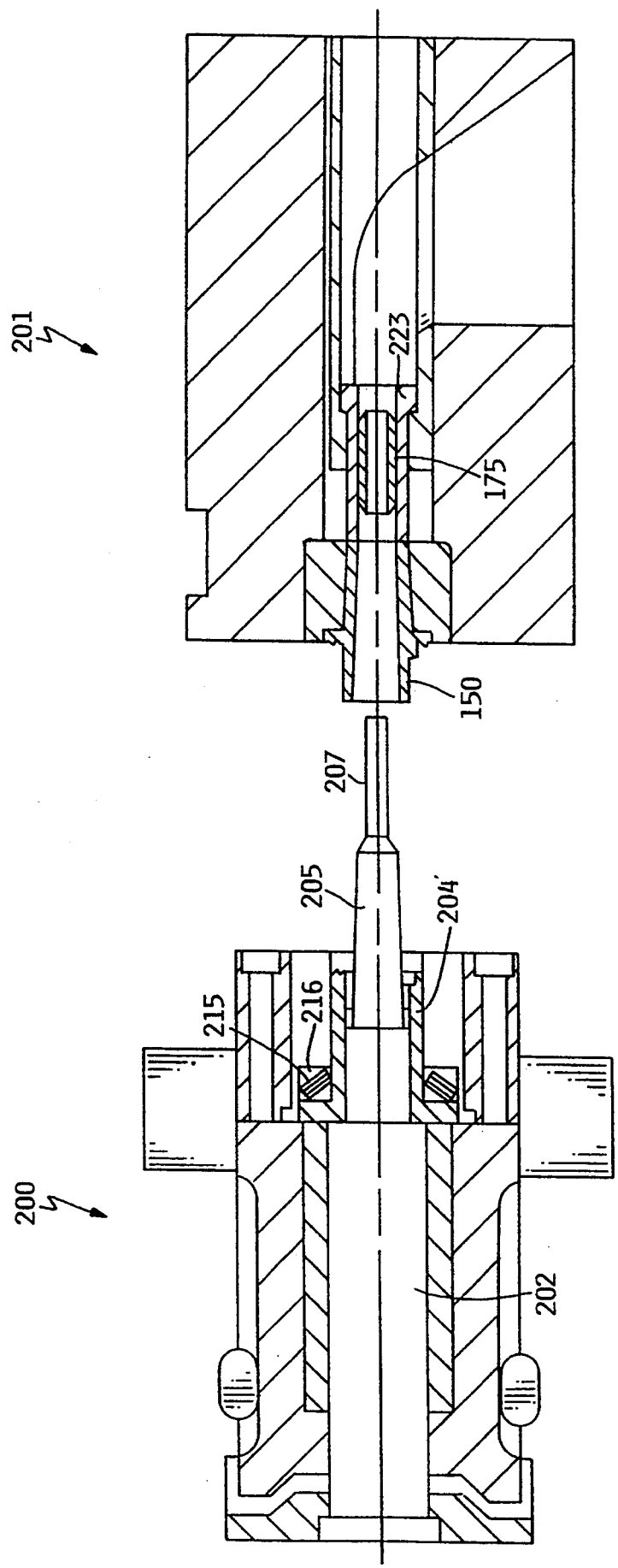
FIG. 28 shows the slidable sleeve die in its retracted condition after formation of the finished battery terminal of FIG. 27.

FIG. 28 shows the dies 200 and 201 separated with the finished battery terminal 150 ready for removal by ejector sleeve 223. Note that die sleeve 204 returns to its retracted condition with compression spring 215 expanding to displace die sleeve 204 to the left into a position for forming another battery terminal.

We claim:

1. The process of cold forming a finished battery terminal having a necked down region on a flange extending outward from the battery terminal without using excessive pressure to produce flash or voids in the finished battery terminal by continually decreasing the size of a die cavity comprising:

placing a lead slug having a central axis, a first end, and a second end, between two dies forming a die flange cavity in the shape of a battery terminal having a flange with a peripheral region;

driving a first punch along a first direction to decrease the size of the die flange cavity by radially expanding the lead slug outward into the die flange cavity to partially fill the die flange cavity to thereby form a semi-finished cold formed battery terminal having a partially radially extending flange; and continuing to drive the first punch in the first direction to further decrease the size of the die flange cavity by further radially expanding the lead slug outward into the die flange cavity to further decrease the size of the die flange cavity while driving a further die having a V-shaped surface into a portion of the partially radially extending flange located radially inward of the peripheral portion of the flange to both radially deform the flange and to form a necked down region on the flange to thereby complete formation of the flange with a necked down region on a finished battery terminal.

2. The process of claim 1 including the step of driving the further die along said central axis.

3. The process of claim 2 including the step of axially expanding the lead into a flange die cavity with the further die and radially expanding the lead into the die cavity with the first punch.

4. The process of claim 1 including the step of axially expanding the lead into the die cavity with the further die.

5. An apparatus for forming a finished battery terminal comprising:

a first die having a cavity in the shape of one portion of a battery terminal; a second die having a cavity in the shape of a further portion of a battery terminal; a punch pin for driving into and radially expanding a lead slug, said punch pin having a central axis, said punch pin having a first surface;

a further die axially slidable with respect to said punch pin, said further die having an end surface with a V-shaped surface for forming a V-shaped groove radially inward of a peripheral region of the cavity for forming the flanged portion of a battery terminal, said further die supported by a compression spring carried by said further die so that when said punch pin is driven into the lead slug, to form a semi-finished battery terminal said further die does not produce a finished die cavity until said compression spring compresses to allow the end surface of said further die to deform a portion of the lead slug in both an axial and radial direction to thereby form a finished battery terminal with a necked down flange in a single stroke of said punch pin.

6. The apparatus of claim 5 wherein the said further die comprises a die sleeve slidable along said punch pin.

7. The apparatus of claim 6 wherein said compression spring normally maintains said further die in a retracted condition.

8. The apparatus of claim 7 wherein said compression spring is sufficiently weak so as to compress during a portion of the stroke of said punch pin.

9. The apparatus of claim 8 wherein said further die has an annular V-shaped protrusion for forming a necked down portion on the flange of a battery terminal.

* * * * *